(12) United States Patent
Goldman et al.

(10) Patent No.: US 6,279,688 B1
(45) Date of Patent: Aug. 28, 2001

(54) CONTROL CABLE SEALING QUICK RELEASE

(75) Inventors: Charles M. Goldman, Chicago; Timothy J. Smith, Barrington, both of IL (US)

(73) Assignee: SRAN Corporation, Chicago, IL (US)

( * ) Notice: Subject to any disclaimer, the term of this patent is extended or adjusted under 35 U.S.C. 154(b) by 0 days.

(21) Appl. No.: 09/277,290

(22) Filed: Mar. 26, 1999

Related U.S. Application Data

(60) Provisional application No. 60/079,546, filed on Mar. 27, 1998.

(51) Int. Cl.[7] .................................................. B62L 3/00
(52) U.S. Cl. ...................................... 188/24.22; 188/24.21
(58) Field of Search ........................... 188/24.11, 24.12, 188/24.21, 24.22; 254/389, 390, 417; 74/500.5, 502.4, 502.6

(56) References Cited

U.S. PATENT DOCUMENTS

| 5,704,453 | * | 1/1998 | Tsai | 188/24.21 |
| 5,855,529 | * | 1/1999 | Sigimoto | 474/80 |
| 5,857,932 | * | 1/1999 | Sigimoto | 474/82 |

* cited by examiner

Primary Examiner—Christopher P. Schwartz
Assistant Examiner—C. T. Bartz
(74) Attorney, Agent, or Firm—Piper Marbury Rudnick & Wolfe; Jefferson Perkins

(57) ABSTRACT

A control cable quick release device for use with cable-actuated brake arms that permits disengagement of the control cable from the brake arm without braking the seal between the quick release device and the deformable bellows thereby preventing premature corrosion of the control cable and permitting quick and easy removal of the bicycle wheel.

3 Claims, 4 Drawing Sheets

CONTROL CABLE SEALING QUICK RELEASE

CROSS-REFERENCE TO RELATED APPLICATIONS

This application claims the benefit of Provisional Patent Application Ser. No. 60/079,546, filed Mar. 27, 1998.

TECHNICAL FIELD OF THE INVENTION

This invention relates generally to bicycle brake control cables and more particularly to quick release devices for detaching brake control cables from brake arm or operating members.

BACKGROUND OF THE INVENTION

Bicycle brake systems typically comprise an actuating or brake lever assembly operatively connected by a control cable within a housing to a responding or brake arm assembly. The brake arm assembly includes a pair of brake arms or operating members pivotally attached to a bicycle frame element at one end and to the control cable at another end, each brake arm including a brake pad positioned such that the two pads sandwich the rim of a bicycle wheel. Actuation of the brake lever by a rider draws the brake arms toward each other until they clamp down on the rim thereby slowing the bicycle. In order to achieve responsive braking, the brake pads are positioned close to the rim with the lever in an undeflected position to reduce the travel of the pads during lever actuation. Consequently, the brake arms must be drawn apart from their adjusted position close to the rim to allow removal of the wheel. To allow the brake arms to be readily drawn apart, a quick release feature is typically included to disengage at least one brake arm from the control cable. The present invention is an improvement to quick release devices for brake control cables and the like.

Numerous types of bicycle brake mechanisms are known in the art including drum brakes, cantilever brakes, disk brakes, caliper brakes and linear-pull brakes. FIG. 1 depicts a conventional linear-pull brake system including a brake lever assembly 10 operatively connected by a control cable 20 within a cable housing 22 to a brake arm assembly 30. FIG. 2 is a front view of the conventional linear-pull brake arm assembly of FIG. 1. FIG. 3 is an isometric view of the quick release device of the linear-pull brake arm assembly of FIG. 1.

Typically, the brake lever assembly 10 consists of a brake lever 40 pivotally mounted at one end to a lever housing 42 attached to a bicycle handlebar 44. One end of the control cable 20 is operatively attached to the brake lever 40 at a cable attachment point 46 such that as the brake lever 40 is deflected by a rider's hand toward the handlebar 44, the tension on the brake cable 20 is increased thereby actuating the brake arm assembly 30.

A second end of the control cable 20 is secured by a cable anchor bolt 50 to one end of a first brake arm 60 pivotally attached about a pivot 62 to a first bicycle frame member 180. A first end of a yoke 70 is hingedly connected to a second brake arm 80 at pivot 81, the brake arm 80 pivotally connected to a second bicycle frame member 190 at pivot 82. First and second brake pads 90, 92 connected to brake arms 60, 80, respectively, are positioned on either side of a bicycle rim 94.

Typically, a first end of cable housing 22 abuts a barrel adjuster 86 operatively connected to lever housing 42, with a second end of cable housing 22 abutting a ferrule 112 located at a first end of a noodle 110. A barrel 95 located at a second end of the noodle 110 includes an attachment plate 96 configured to be removably coupled to a second end 84 of yoke 70, and a conical surface 98 configured to be removably coupled to a first end 101 of an elastically compressible bellows 100. The control cable 20 slides reciprocally within cable housing 22, noodle 110, ferrule 112, barrel 95, and bellows 100. As installed, a second end 103 of the bellows 100 is located proximate the cable anchor bolt 50. During lever actuation the bellows member 100 is compressed as the brake arms 60, 80 are drawn together.

The barrel 95 is configured to be removably inserted through an aperture 115 located at a second end 84 of the yoke 70, with a slot 113 extending from the aperture 115 to an edge of the yoke 70. Attachment plate 96 of barrel 95 is configured to abut the second end 84 of the yoke 70 as the remaining portion of the barrel 95 is inserted through aperture 115.

Typically, the brake arms 60, 80 are spring biased to pivot in an outward direction away from the rim 94. As installed, the brake pads 90, 92 are positioned proximate the wheel rim 94 such that when the brake lever 40 is deflected by a rider's hand, the brake pads will contact the wheel rim 94 thereby slowing the bicycle. Because the brake pads 90, 92 are positioned relatively close to the rim 94, the bicycle wheel cannot be removed from the brake arm assembly without first detaching the barrel 95 from the yoke 70 thereby allowing the outwardly biased brakes arms 60, 80 to pivot apart. In conventional brake arm assemblies this operation is achieved as follows. Initially, the first end 101 of the bellows 100 is be pulled apart from surface 98 of the barrel 95 by displacing the bellows in a direction X thereby breaking the seal formed between the barrel 95 and the bellows 100 and exposing the bare control cable 20. The barrel 95 is then retracted from aperture 115 of the yoke 70 in a direction Y. Finally, the barrel 95 is lifted in a direction Z as control cable 20 passes through slot 113 of the yoke 70. In order to reattach the barrel 94 to the yoke, this procedure must be repeated in reverse order. This rather cumbersome procedure makes it difficult to engage and disengage the barrel 95 from the yoke 70. Additionally, removal of the bellows 100 from the barrel 95 breaks the seal between these members exposing the bare control cable to moisture and allowing dirt and debris to become trapped inside the bellows, barrel, and noodle leading to premature wear, corrosion and reduced braking performance. Furthermore, repeated attachment and detachment of the bellows 100 to the barrel 95 causes the bellows to stretch and fray over time, preventing the bellows from fitting tightly onto surface 98 of the barrel 95 and resulting in a permanent loss of sealing.

SUMMARY OF THE INVENTION

It is an object of this invention to facilitate wheel removal by providing a quick release device that permits a user to readily disengage a brake control cable from a brake operating member. It is another object of this invention to provide a quick release device for a brake control cable that does not require disengagement of the bellows member from the barrel member thereby preserving the seal between these members during wheel removal. It is a further object of this invention to provide a quick release device having an easily graspable surface with which to engage and disengage the quick release device from the brake operating member.

According to this invention, a quick release device for use with cable-actuated operating members is provided including an elastically deformable member connected to a rigid housing, both the housing and deformable member configured to slidably receive a control cable therethrough. The housing includes a graspable portion for easy disengagement of the quick release from the operating member and an engagement portion configured to be removably engaged with an attachment portion of the operating member without detaching the deformable member from the housing.

BRIEF DESCRIPTION OF THE DRAWINGS

Further aspects of the invention and their advantages will be discerned with reference to the appended drawings, in which like characters identify like parts and in which.

DETAILED DESCRIPTION OF THE INVENTION

Figure 1:
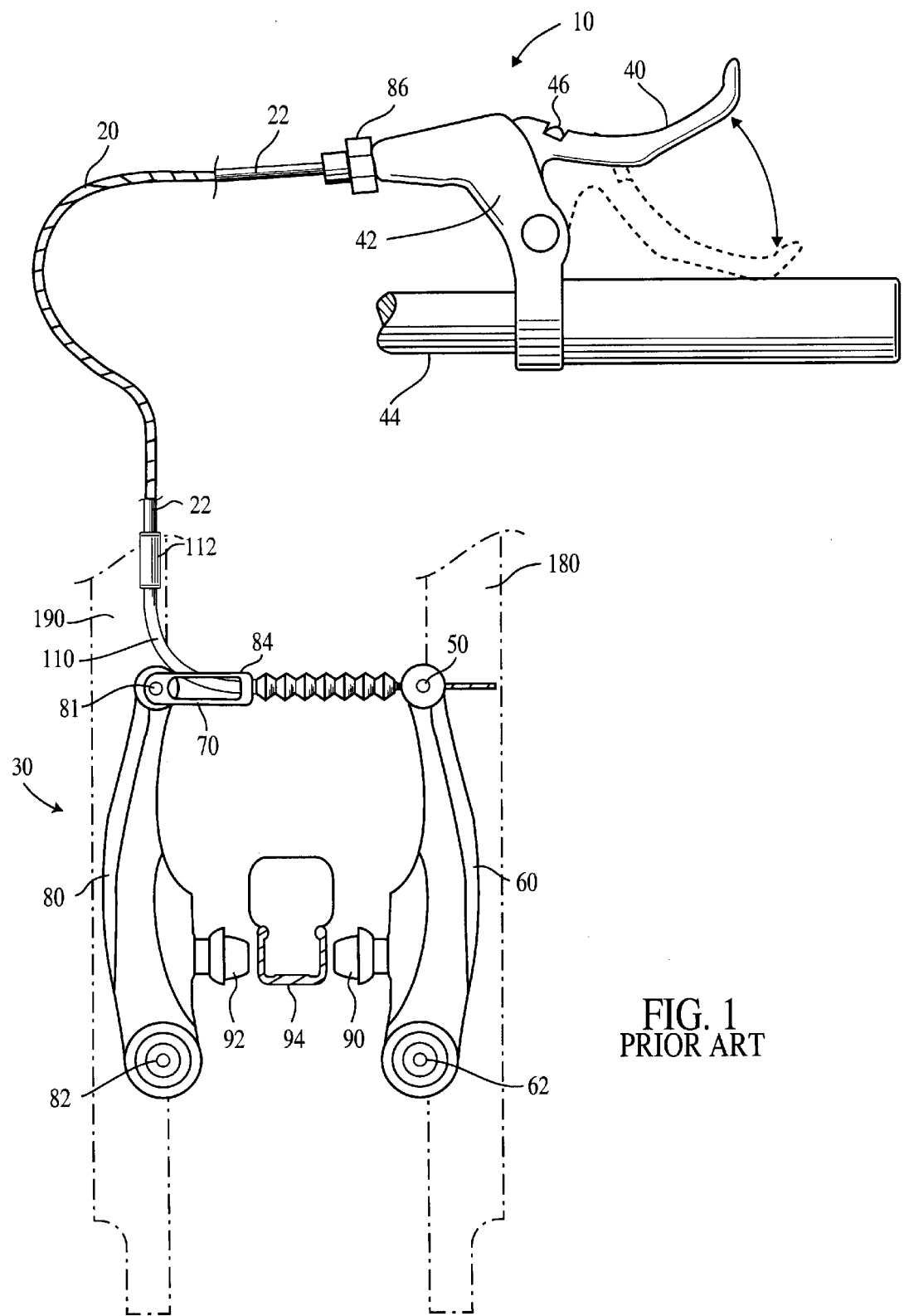
FIG. 1 shows a conventional linear-pull brake system including a brake lever assembly operatively connected by a control cable within a cable housing to a brake arm assembly.
Figure 2:
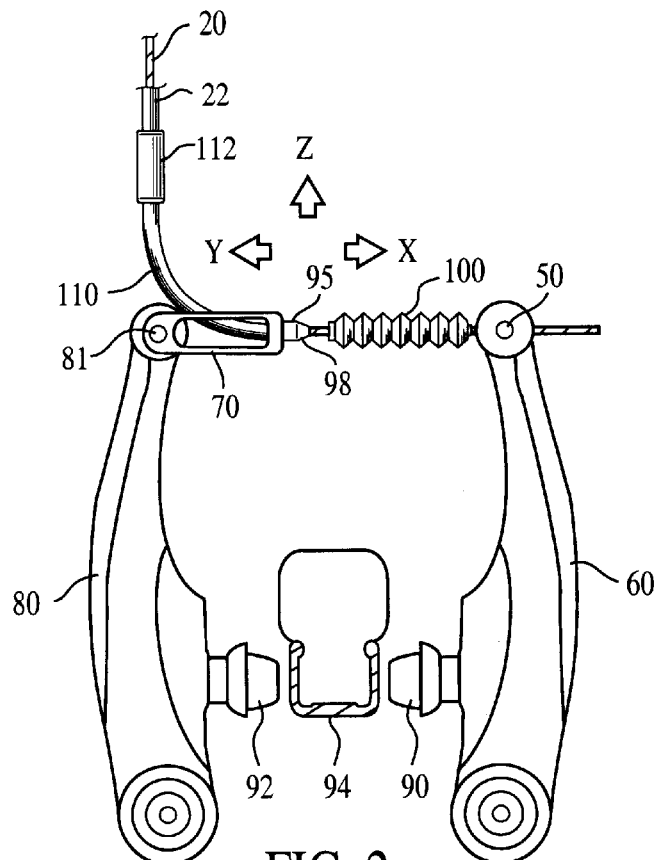
FIG. 2 is a front view of the conventional linear-pull brake arm assembly of FIG. 1.
Figure 3:
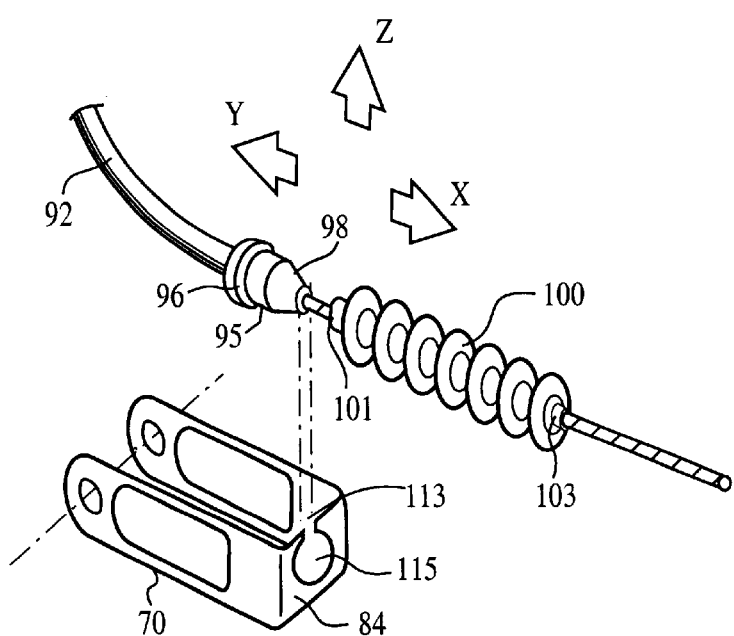
FIG. 3 is an exploded isometric view of the quick release device of the linear-pull brake arm assembly of FIG. 1.
Figure 4:
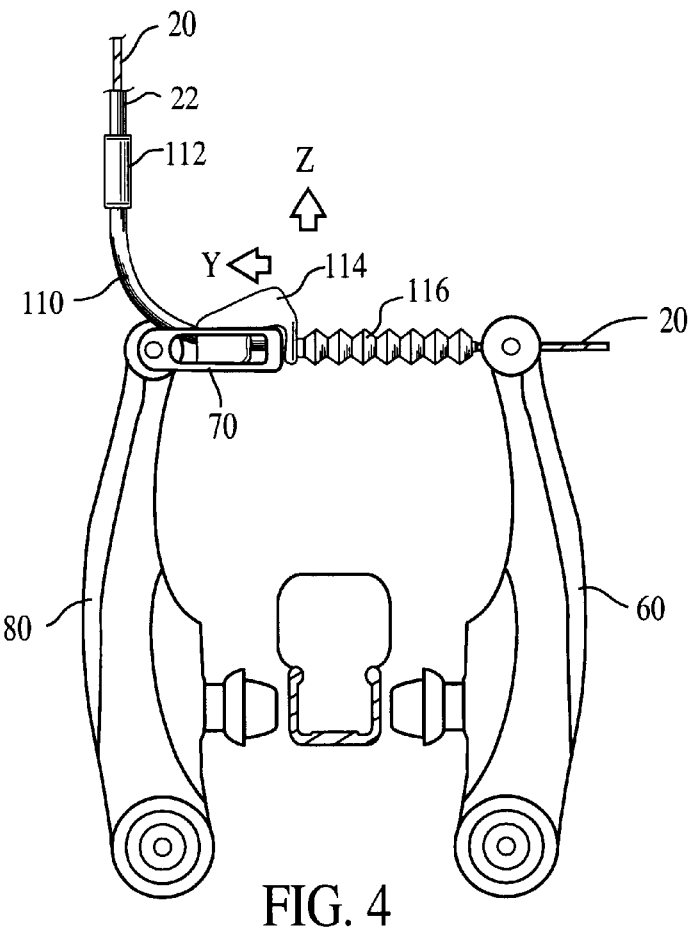
FIG. 4 is a front view of the sealing quick release device according to the invention as installed on a brake arm assembly.
Figure 5:
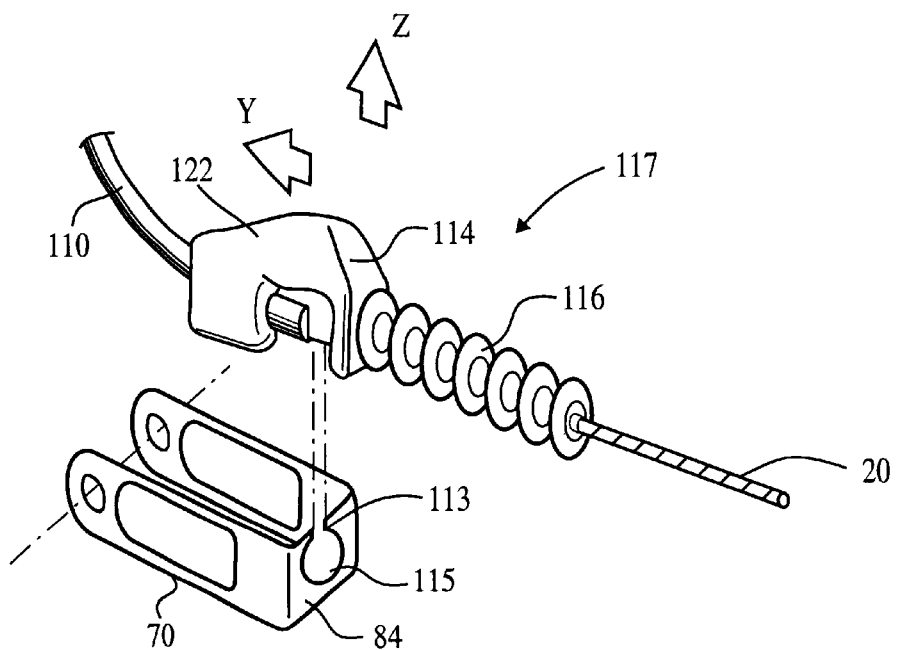
FIG. 5 is an exploded isometric view of the sealing quick release of this invention.
Figure 6:
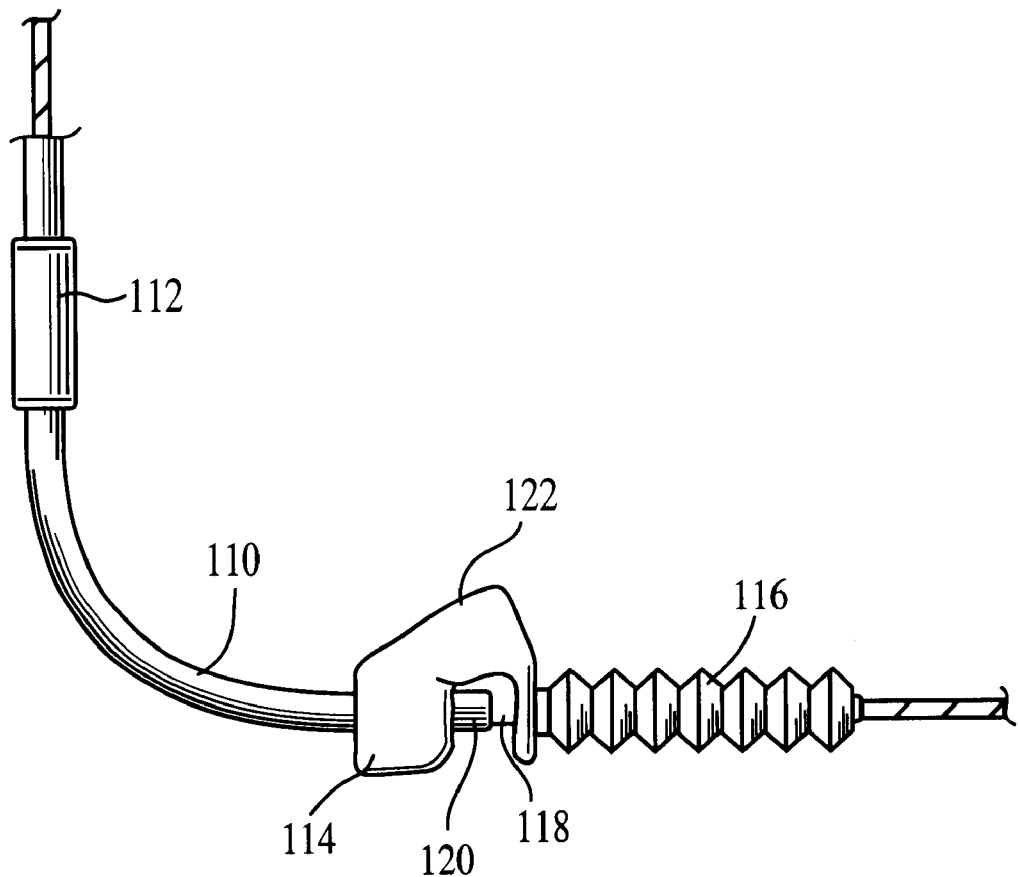
FIG. 6 is a front view of the sealing quick release device of this invention.

With reference to FIGS. 4–6, a sealing quick release device 117 includes a graspable rigid housing 114 sealably attached to an elastically deformable bellows 116. The rigid housing 114 is attached to a noodle 110 that ends at a ferrule 112, the ferrule 112 abutting the cable housing 22. Control cable 20 is located within and reciprocally slides through the noodle 110, ferrule 112, rigid housing 114, as well as the bellows 116. The housing 114 includes an engagement portion that has a blade portion 118 which is relatively thin in an X-direction (out of the plane of the paper in FIG. 6). Blade portion 118 is configured to be removably inserted through slot 113, a boss 120 or plug portion configured to be removably inserted through aperture 115, and a graspable portion 122 configured to be easily graspable by a user's hand.

During installation of the quick release device 117, the blade section 118 of housing 114 is lowered through slot 113 and boss or plug 120 is then inserted into aperture 115. Removal of the sealing quick release is accomplished by simply grasping the housing 114 at portion 117, moving it slightly in a direction Y to disengage the boss 120 from the aperture 115, and lifting the quick release 117 assembly in a direction Z. The boss 120 is configured to sufficiently engage aperture 115 such that the quick release 117 will not inadvertently disengage during riding. In a preferred embodiment, noodle 110 is made of a lightweight aluminum, housing 114 of molded plastic, and bellows 116 of a rubber elastomer.

Whereas existing barrel assemblies are difficult to grasp, require the seal between the barrel and the bellows to be broken during wheel removal, and are cumbersome to engage and disengage, the present invention allows the user to quickly and easily engage and disengage the quick release assembly without breaking the seal. Accordingly, wheel removal can likewise be accomplished quickly and easily.

While the present invention has been described with respect to linear pull brake arm assemblies, it may also be used on other types of brake mechanisms. Additionally, the present invention may be adapted for use in many non-brake applications involving cable-actuated operating members. Accordingly, the present invention is not limited by the illustrated embodiments but by the scope and spirit of the claims which follow.

We claim:

1. A quick release device for use with a cable-actuated operating member, comprising:

an elastically deformable member; and a rigid housing connected to said deformable member, both said housing and said deformable member configured to slidably receive a cable therethrough, said housing including a graspable portion and an engagement portion configured to be removably engaged with an attachment portion of the operating member without detaching said deformable member from said housing.

2. The quick release device of claim 1, wherein:

the attachment portion of the operating member includes a yoke pivotally attached to the operating member at a first end of the yoke, the yoke including an aperture and slot at a second end of the yoke, the slot extending from the aperture to an edge of the yoke; and the engagement portion of said housing includes a blade portion configured to be removably received by the slot in the yoke and a plug portion configured to be removably received by the aperture in the yoke.

3. The quick release device of claim 1, wherein said deformable member is sealably connected to said housing at a first end and constricted at a second end to sealably engage the cable, and said housing is configured to sealably engage a cable housing disposed at a end of said housing remote from said deformable member.

* * * * *

UNITED STATES PATENT AND TRADEMARK OFFICE
CERTIFICATE OF CORRECTION

PATENT NO. : 6,279,688 B1  Page 1 of 1
DATED : August 28, 2001
INVENTOR(S) : Charles M. Goldman, Timothy J. Smith It is certified that error appears in the above-identified patent and that said Letters Patent is hereby corrected as shown below:

<u>Title page,</u>
Item [73] Assignee, delete "SRAN" and insert -- SRAM --.

Signed and Sealed this

Fifth Day of March, 2002

Attest:

JAMES E. ROGAN
*Attesting Officer*  *Director of the United States Patent and Trademark Office*